United States Patent [19]

Stolz et al.

[11] Patent Number: 5,257,884
[45] Date of Patent: Nov. 2, 1993

[54] DEVICE FOR REMOVABLY SECURING A TOOL TO A MACHINE SPINDLE

[75] Inventors: Gerhard Stolz, Ingersheim; Gerhard Scheer, Loechgau, both of Fed. Rep. of Germany

[73] Assignee: KOMET Praezisionswerkzeuge Robert Breuning GmbH, Besigheim, Fed. Rep. of Germany

[21] Appl. No.: 835,983
[22] PCT Filed: Aug. 28, 1990
[86] PCT No.: PCT/EP90/01431
§ 371 Date: Feb. 20, 1992
§ 102(e) Date: Feb. 20, 1992
[87] PCT Pub. No.: WO91/03346
PCT Pub. Date: Mar. 21, 1991

[30] Foreign Application Priority Data
Sep. 9, 1989 [DE] Fed. Rep. of Germany ....... 3930074

[51] Int. Cl.⁵ .......................... B23C 5/26; B23B 31/04
[52] U.S. Cl. ................................ 409/232; 82/158; 408/239 R; 409/234
[58] Field of Search .................. 409/232, 234, 233; 403/362; 428/239 R, 238; 279/83; 82/158

[56] References Cited

U.S. PATENT DOCUMENTS

| | | | |
|---|---|---|---|
| 4,797,041 | 1/1989 | Glaser | 409/232 |
| 4,913,607 | 4/1990 | von Haas | 409/234 |
| 4,915,523 | 4/1990 | Andersson | 409/234 X |
| 4,976,574 | 12/1990 | Mvendlein et al. | 409/232 |

FOREIGN PATENT DOCUMENTS

| | | | |
|---|---|---|---|
| 310942 | 4/1989 | European Pat. Off. | 409/234 |
| 8405489.1 | 8/1985 | Fed. Rep. of Germany | |
| 3410154 | 10/1985 | Fed. Rep. of Germany | |
| 3522555 | 6/1986 | Fed. Rep. of Germany | |
| 4004150 | 9/1990 | Fed. Rep. of Germany | 409/232 |
| 283096 | 10/1990 | German Democratic Rep. | 409/232 |

*Primary Examiner*—William Briggs

[57] ABSTRACT

The invention relates to a device for removably securing a tool (12) to the spindle (10) of a machine tool with a fitting aperture (16) concentric with the spindle axis, a fitting pin (18) engaging in the fitting aperture (16), two clamping bolts (26) arranged in the fitting pin so as to be radially movable towards opposite sides, a clamping member (32) movable axially by means of a tensioning mechanism fitted on the spindle side and two tapered surfaces (48, 30) fitted on the clamping member (32) on the one hand and on the clamping bolts on the other for the radial adjustment of the clamping bolts (26) between a release position withdrawn in the fitting pin (18) and a clamping position shifted radially outwards. In order to be able to clamp large tools securely, even with a relatively short axial clamping travel of the central securing and clamping mechanism on the spindle side, the clamping member (32) and the clamping bolts (26) each have a transverse groove therein (50, 52) limited by transverse sides in the region of their facing tapered surfaces (48, 30) by means of which the tapered surfaces are divided into two partial surfaces arranged at a distance from each other. In the release position, one of the partial surfaces (48″, 30′) is received in the opposite transverse groove (50, 52) in the manner of a toothed gear, while in the clamping position both partial surfaces (30′, 48′, 30″, 48″) lie mutually opposite each other.

27 Claims, 9 Drawing Sheets

DEVICE FOR REMOVABLY SECURING A TOOL TO A MACHINE SPINDLE

FIELD OF THE INVENTION

The invention relates to a device for releasably connecting a tool to a spindle of a machine tool comprising a fitting aperture concentric with respect to the spindle axis, a fitting pin extending into the fitting aperture, at least one clamping bolt movably supported in radial direction in the fitting pin, a clamping member axially movable by means of a clamping mechanism arranged in the spindle, and two tapered surfaces, one being provided on the clamping member and the other being provided on the clamping bolt, are positioned inclined with respect to the spindle axis, and rest against one another for facilitating a radial adjustment of the clamping bolt between a release position pulled back into the fitting pin and a radially outwardly extended clamping position.

BACKGROUND OF THE INVENTION

Connecting devices of this type are primarily used in machine tools having an automatic tool exchange in particular for machining centers with a center tool-feeding apparatus. This tool-feeding apparatus, which is primarily provided with a steep-angle taper to receive the tool, operates in most machining centers through a cup-spring package with hydraulic relaxation. A head bolt arranged on the steep-angle taper is pulled into the spindle by a tong-like gripping means clamping the steep-angle taper. The clamping path needed in the case of the steep-angle taper amounts to approximately 6 to 10 mm depending on the size of the spindle. In order to achieve at a given spindle size an increased support compared with the steep-angle taper connection, it has already been suggested to replace the steep-angle taper receiving means with a cylindrical receiving means having a front-face planar surface support for the tool (Magazine "Werkstatt und Betrieb" 119 (1986), Pages 797 to 801) and to use at the same time the center tool-feeding apparatus already existing in many machine tools as a clamping mechanism.

Thus, the conventional tool of the type mentioned above has two clamping bolts radially movably supported in the fitting pin, which clamping bolts can be moved diametrically outwardly by a clamping member designed as a drawing part and axially movable by the clamping mechanism arranged on the spindle. In their outwardly moved clamping position, the clamping bolts, with their truncated-cone-shaped tips, extend into a conical recess in the area of the bore wall of the receiving means in order to pull an annular planar surface adjoining the fitting pin against a planar surface adjoining the fitting aperture and to brace same. The clamping bolts were in the release position pulled so far back into the fitting pin that the fitting pin can be pulled out of the fitting aperture during the tool exchange. The clamping force transferable onto the tool coupling at a given feeding force provided by the center clamping mechanism is larger the smaller is the wedge angle of the wedge drive formed by the tapered surfaces of the clamping member and of the clamping bolt. On the other hand, it is not possible to reduce at random the size of the wedge angle of the known tool coupling since this effects also the radial stroke of the clamping bolts as a given axial adjustment path of the clamping mechanism becomes smaller. This disadvantage exists in particular in the case of larger tools, which besides an increased clamping force require also a greater adjusting stroke of the clamping bolt. Thus, the known clamping mechanisms with cup-spring packages cannot easily be utilized mainly in larger tools with planar-surface bracing. Instead, hydraulic tool-clamping means have already been utilized, which enable a larger adjustment path. The here needed, complicated change-over of machine tools and machining centers limits, however, the area of use of the tools with planar-surface bracing.

SUMMARY OF THE INVENTION

The basic purpose of the invention is therefore to provide a connecting device of the above-mentioned type, which also in the case of large tools guarantees a reliable planar-surface bracing with a high clamping force and which is still sufficient with a relatively small axial clamping path provided by the center pull-in and clamping mechanism on the spindle.

The invention is mainly based on the thinking that the major portion of the stroke path is necessary for the almost force-free movement of the clamping bolt from its release position, in which it is pulled back into the fitting pin, into its clamping position, and that the actual clamping operation requires only a very small stroke path. In order to guarantee, on the other hand, a moment-free transfer of force, it must be assured that the tapered surfaces rest on one another and have a large base surface during the actual clamping operation. In order to achieve this, the invention suggests that the clamping member and the clamping bolt have a transverse groove defined by transverse flanks in the area of their tapered surfaces facing one another, through which transverse groove the tapered surfaces are each divided into two partial surfaces arranged spaced from one another, and limited on one side by one of the transverse flanks and on another side by an outer transverse edge, that in the release position each of the partial surfaces extends into the oppositely lying transverse groove in the manner of a toothed gear, that during the clamping operation at least one of the transverse flanks and/or transverse edges which strike one another has a receiving slope which is steeper relative to the spindle axis compared with the tapered surface, and that in the clamping position both partial surfaces rest against one another.

An optimum adjustment to the given clamping mechanism can be achieved also for large tools because the taper is adjusted to a range of from 8° to 20° and the receiving slope to a range of from 40° to 70°.

The transverse grooves in the clamping bolt and in the clamping member have in the finished state an essentially trapezoidal cross section with outwardly diverging flanks. According to an advantageous development of the invention, the receiving slope has an angle variable with respect to the spindle axis. It can, for example, be curved convexly and, if necessary, transfer continually and smoothly into the tapered surface.

In order to keep the maximum torque transmitted during the clamping operation by the clamping member onto the clamping bolt as small as possible, the transverse flank of the clamping bolt is rotationally symmetrical on its outer surface, which transverse flank hits during the clamping operation the clamping member first near the axis of the clamping bolt. The transverse edge of the clamping bolt, which transverse edge hits the transverse flank of the clamping member during the clamping operation, is at least once, preferably twice chamfered or convexly curved.

According to a preferred development of the device of the invention, in which the clamping bolt has two guide cheeks for the clamping member, which guide cheeks laterally limit the tapered surfaces, the transverse groove of the clamping bolt is limited at least at one end by one of the guide cheeks.

When the transverse groove is manufactured using the spark-erosion method, the front-face boundary surfaces of the transverse groove project step-like over the guide surfaces of the guide cheeks, while the clamping member has at its lateral guide surfaces in the area of the parts engaging the transverse groove a corresponding material removal.

When on the other hand the transverse groove is a milled groove, then the milling tool can be introduced through a premanufactured slotted hole in one of the guide cheeks, while on the side opposite the slotted hole and in extension of the transverse groove a blind hole with the contour of the transverse edge can be formed from the inside into the respective guide cheek. A material removal on the clamping member is not necessary in this case.

In order to guarantee a sufficient lubrication in the area of the tapered surfaces, the clamping bolt has a lubricating channel leading from its preferably cylindrical outer surface to the tapered surface, with one end of the lubricating channel terminating in the transverse groove.

The lubrication is preferably done through transverse bores, which extend through the guide cheeks into the transverse groove. A transverse bore is advantageously arranged in each guide cheek, with the transverse bores being able to extend into the transverse groove preferably in the area of each one of the transverse edges, a blind hole open toward the transverse groove and aligned with the transverse bore being able to be arranged in the respectively oppositely lying guide cheek. At least one of the transverse flanks can thereby be formed by a portion of the transverse-bore surface, which portion extends into the area of the tapered surface. The latter is the case when the transverse bores are used at the same time as auxiliary bores during the manufacture of the transverse groove using the milling method. The transverse-groove base can then be aligned essentially perpendicularly with respect to the transverse-bore axis. A centering bore can be introduced as a manufacturing aid into the transverse-groove floor, which centering bore is coaxial with respect to the clamping-bolt axis and, if necessary, intersects the receiving slope.

The clamping bolt is during a tool exchange, when the clamping mechanism is released, moved automatically into its release position within the fitting pin through engagement of the conical tip with the spindle bore. Since during the removal task the tool is slowly accelerated by the tool changer, the force peaks hereby acting onto the clamping bolt are relatively small so that a forced movement of the clamping bolt by the clamping mechanism is not problematic. This thinking does not necessarily apply to the equipping operation since there the fitting pin is moved with a relatively high speed into the fitting aperture and accordingly a projecting clamping bolt will be loaded with a high peak force. According to a preferred further development of the invention, it is therefore suggested that the clamping bolt be releasably held in a release pulled back position in the in the fitting pin. This can be accomplished by a device having a stop screw screwed into a fitting pin and extending with its tip into a groove of the clamping bolt, which groove is closed as its ends, by the screw tip carrying a locking ball movable against the force of a spring, which locking ball engages in the pulled-back release position of the clamping bolt a locking recess arranged in the area of the floor of the groove. The locking connection between the clamping bolt and the fitting pin created in this manner during a tool exchange is again released without a great input of force being required during the clamping operation by the clamping mechanism.

BRIEF DESCRIPTION OF THE DRAWINGS

The invention will be discussed hereinafter in greater detail in connection with one exemplary embodiment schematically illustrated in the drawings, in which:

FIG. 1c shows a detail enlargement of FIG. 1a;

DETAILED DESCRIPTION

Figure 1A:
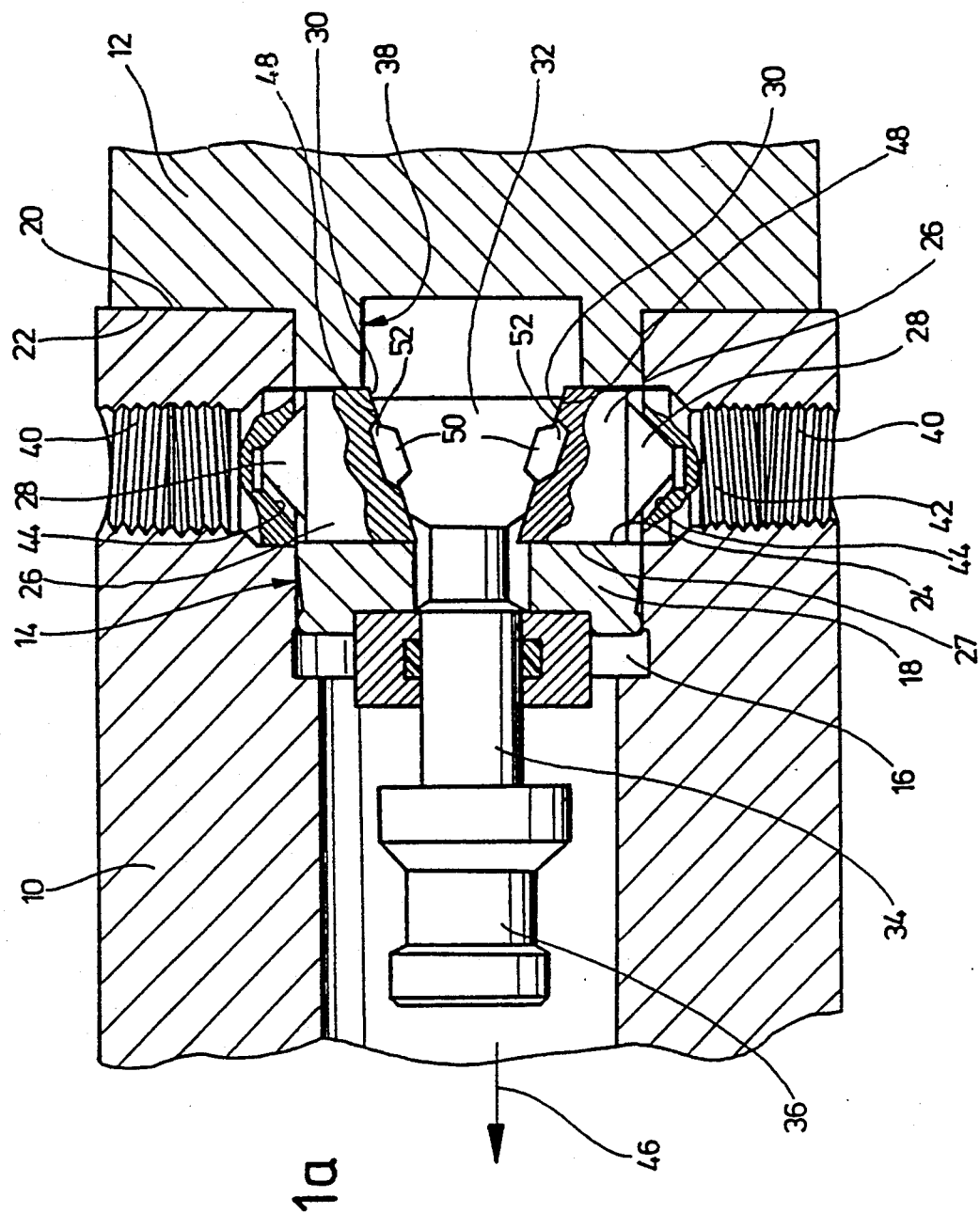
FIG. 1a is a cross-sectional view of a connecting device between a machine spindle and a tool in the clamping position.

FIGS. 1a and b show that a tool 12, for example a boring rod (not otherwise illustrated), can be replaceably connected by means of a connecting device 14 to a rotatably supported spindle 10 of a machine tool (not otherwise illustrated), for example of a machining center. The spindle 10 has for this purpose a fitting aperture 16 which is concentric to the spindle axis and into which can be axially guided a cylindrical fitting pin 18 arranged on the tool. In the tensioned state of the connecting device, the annular planar surface 20, defining the front face of the fitting aperture 16 and the planar surface 22 annularly surrounding the fitting pin at its root are axially pressed against one another. This planar surface bracing is achieved by the hereinafter described coupling mechanism:

Two diametrically opposite clamping bolts 26 are radially movably supported in a radial bore 24 in the fitting pin 18. The clamping bolts 26 each have an essentially cylindrical outer surface 27, a radially outwardly extending truncated-cone-shaped tip 28 and an inwardly extending tapered surface 30. Between the tapered surfaces 30 of the two clamping bolts 26, which tapered surfaces face one another, there is provided a clamping member 32, which is designed as a double tapered wedge-shaped member and which is rigidly connected to a pull rod 34 axially projecting beyond the free end of the fitting pin 18 and is axially movable relative to the fitting pin. The pull rod 34 carries a coupling element 36 which can be clamp-like enclosed by a clamping mechanism on the spindle, which clamping mechanism is not illustrated in the drawings. A cavity 38 for receiving the clamping member 32 in the release position is arranged in the tool body 12. Screw threaded plugs 42 are screwed into the spindle 10 in the area of the fitting aperture 16 in two diametrically opposed internally threaded openings 40, which screw plugs have radially inwardly extending conical recesses 44 for receiving the truncated-cone-shaped tip 28 of the respectively adjacent clamping bolt 26. When the pull rod 34 is axially moved in direction of the arrow 46 by the clamping mechanism (not illustrated), then this movement is converted into a radial stroke of the clamping bolts 26 through the wedge-shaped clamping member 32. The truncated-cone-shaped tips 28 penetrate thereby into the conical recesses 44 in the screw plugs 42 until a bracing of the conical and tapered surfaces, which rest against one another and, as a consequence of the relative axial shifting of the mentioned surfaces, a bracing of the planar surfaces 20, 22 occurs.

Figure 1B:
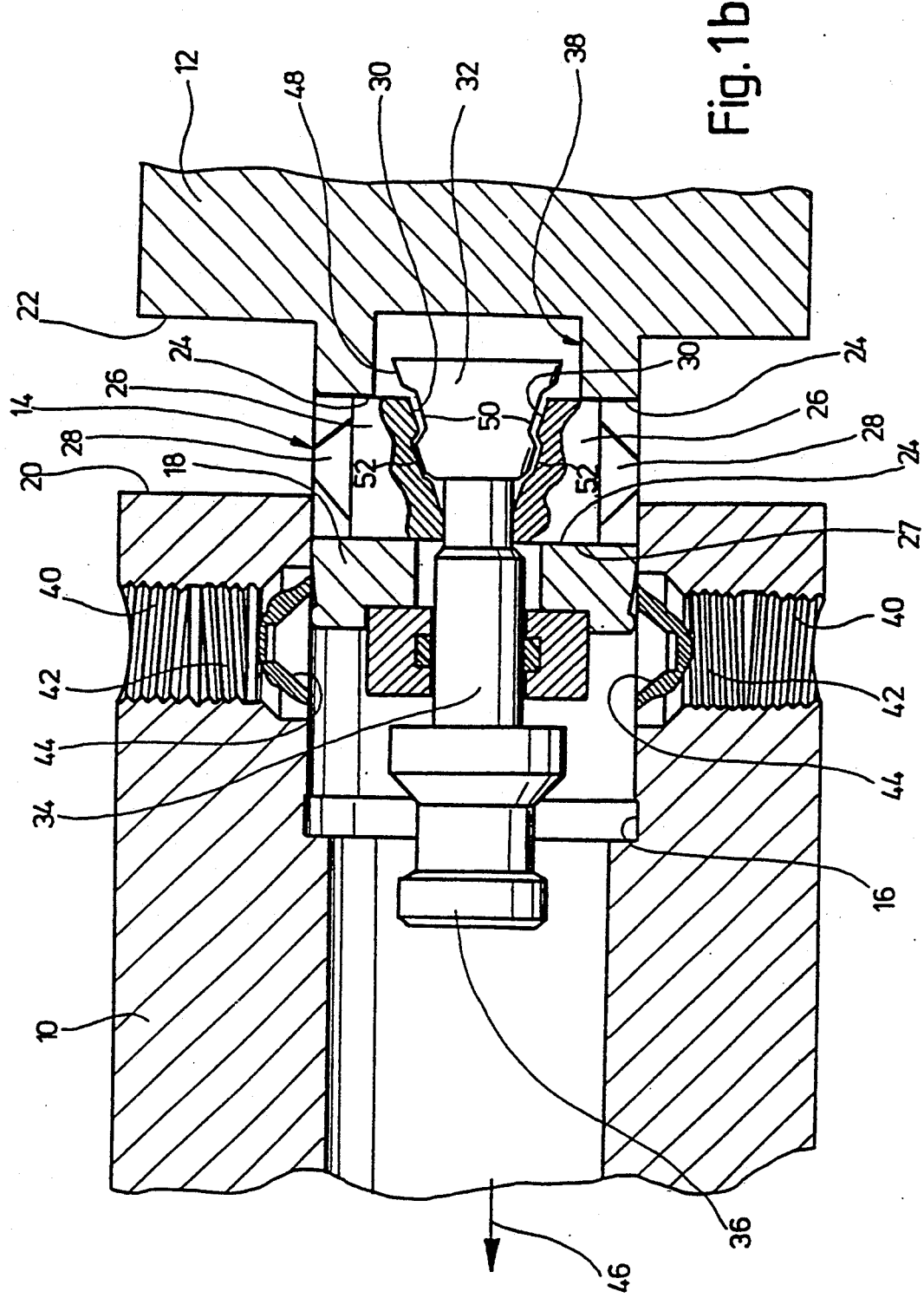
FIG. 1b is a cross-sectional view of the connecting device in the release position.
Figure 1C:
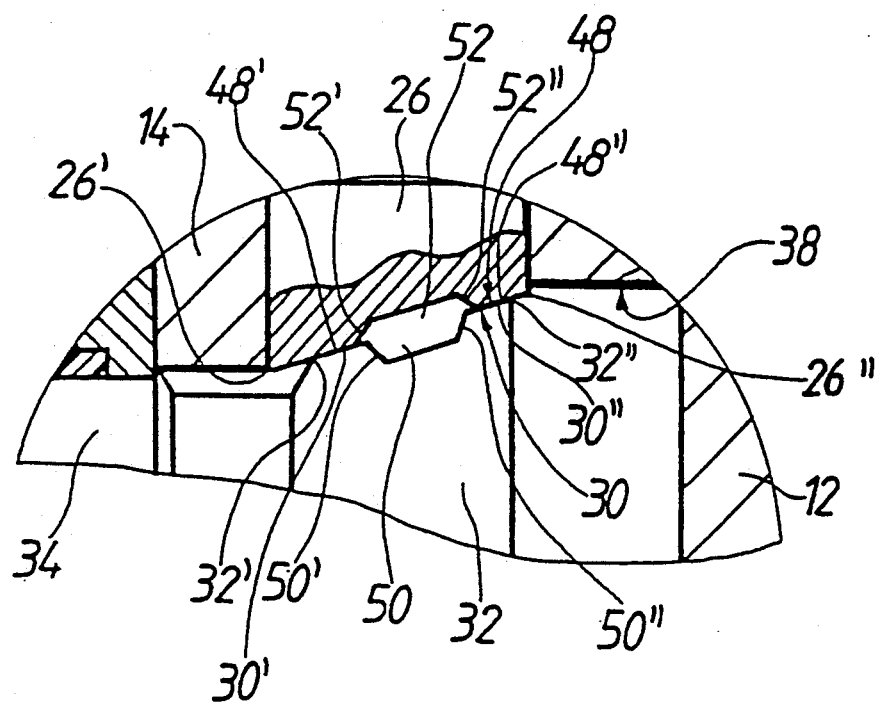

The clamping member 32 and the clamping bolts 26 each have in the area of their opposing tapered surfaces 48 or 30 one transverse groove 50, 52 defined by transversely extending flanks 50', 50" or 52', 52", which transverse grooves divide each of the tapered surfaces 30 or 48 into two partial surfaces 30', 30" or 48', 48" arranged spaced from one another, and limited on the one side by one of the transverse flanks and on the other side by an outer transverse edge 26', 26" or 32', 32". In the release position (FIG. 1b), each of the partial surfaces 30' or 48" is received in the oppositely lying transverse groove 52 or 50, while in the clamping position (FIGS. 1a, c), both partial surfaces 30', 48' or 30", 48" rest in pairs against one another. The transverse flanks 52' of the transverse groove 52 and the transverse edges 32' of the clamping member 32 strike in pairs against one another during the clamping operation. The edges are on the rod side and form a receiving slope which is steeper compared with the tapered surface 30 or 48 relative to the spindle axis, so that in the transition area the axial path of movement of the pull rod 34 is converted into a relatively large stroke of the clamping bolts 26. This is possible because the stroke conversion occurs practically force-free. The actual clamping operation starts only when the tapered surfaces 30' or 48' on the one side and 30" or 48" on the other side are moved with their small tapered angle against one another and thereby guarantee a correspondingly large power ratio. The base surface of the wedge drive is not changed in the clamping state by the transverse grooves 50 and 52. The gap in the tapered surface created by the transverse grooves is even of an advantage during the clamping operation, if one considers the machining inexactnesses during the manufacture of the planar surfaces.

Figure 2:
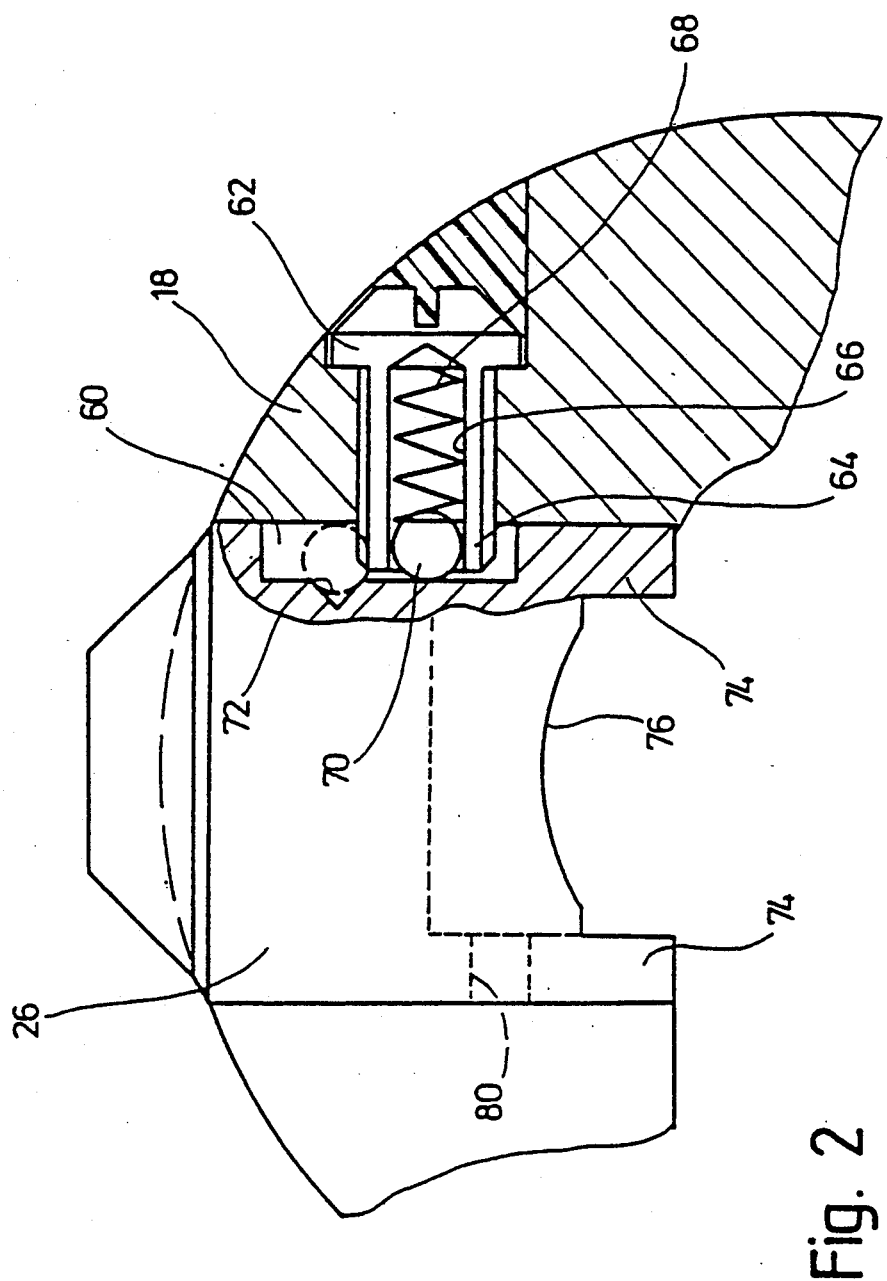
FIG. 2 is a cross-sectional view of a locking mechanism for the clamping bolt.

In order to prevent an inadvertent removal of the clamping bolts 26 from the fitting pin 18, the stroke of the clamping bolts 26 is limited in both directions by a longitudinal groove 60 (FIG. 2) closed at its ends and a stop screw 62 screwed into the fitting pin 18 so that its tip 64 extends into the longitudinal groove 60. The stop screw 62 has in its shaft a cylindrical bore 66 open toward the tip. A compression spring 68 and a locking ball 70 are arranged in the bore 66. The locking ball 70, when the clamping bolt 26 is in its released pulled back position into the inside of the fitting pin 18, extends into a locking recess 72 arranged in the base of the groove so that the clamping bolt, during a handling of the tool 12 outside of the machine spindle 10, cannot reach its outwardly shifted position. The locking connection is released only when the clamping operation is started by reason of a tool having been placed onto the spindle 10.

The tapered surface 30 of each clamping bolt is positioned laterally between guide cheeks 74 for guiding the clamping member 32 therebetween. A cylindrical notch 76 assures that the pull rod 34 in the release position can still extend past the clamping bolt when the clamping bolt is pulled back into the fitting pin.

Figure 3:
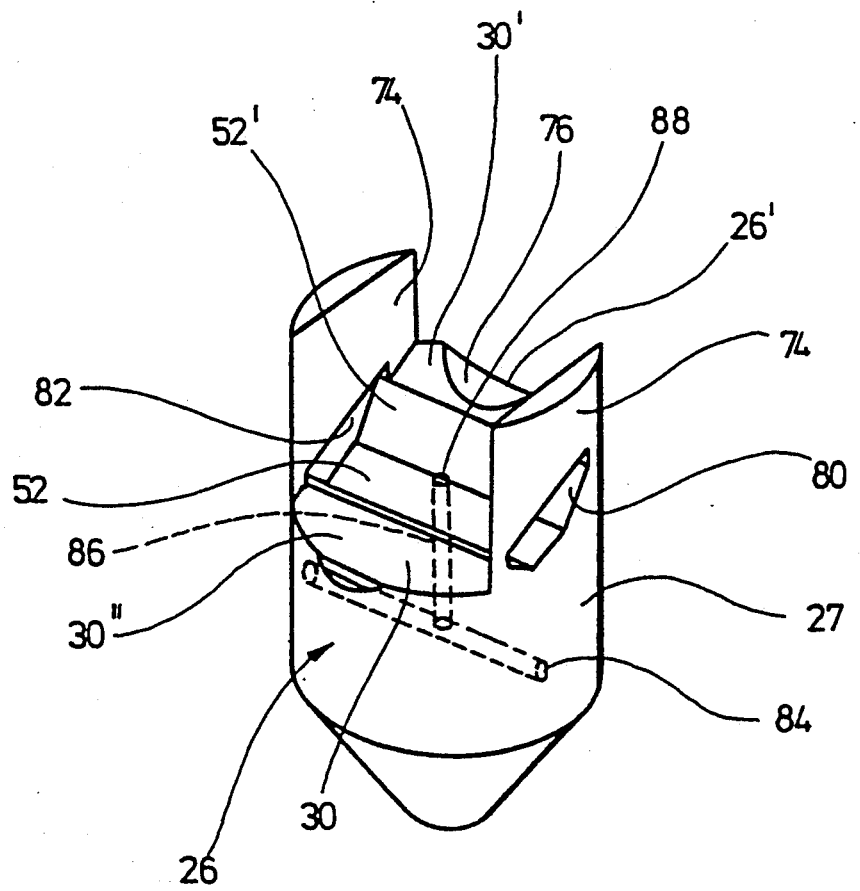
FIG. 3 is a perspective illustration of a clamping bolt with a milled transverse groove.

The transverse groove 52 in the clamping bolt illustrated in FIG. 3 is manufactured by a milling method. One of the side cheeks 74 is, for this purpose, first provided with a slotted hole 80 through which the milling tool can be introduced from the side into the area of the tapered surface 30. The slotted hole 80 is changed during the milling operation to the trapezoidal contour of the transverse groove 52. A blind-holelike recess 82 with the same contour as the transverse groove 52 is milled also during the milling operation into the side cheek opposite the slotted hole 80. The recess 82 guarantees that a removal of material from the side cheek of the clamping member 32 is not necessary.

Lubricant bores 84, 86 leading from the outer surface 27 to the tapered surface are furthermore provided in the clamping bolt 26, the end 88 of which bores terminating within the transverse groove 52.

Figure 4:
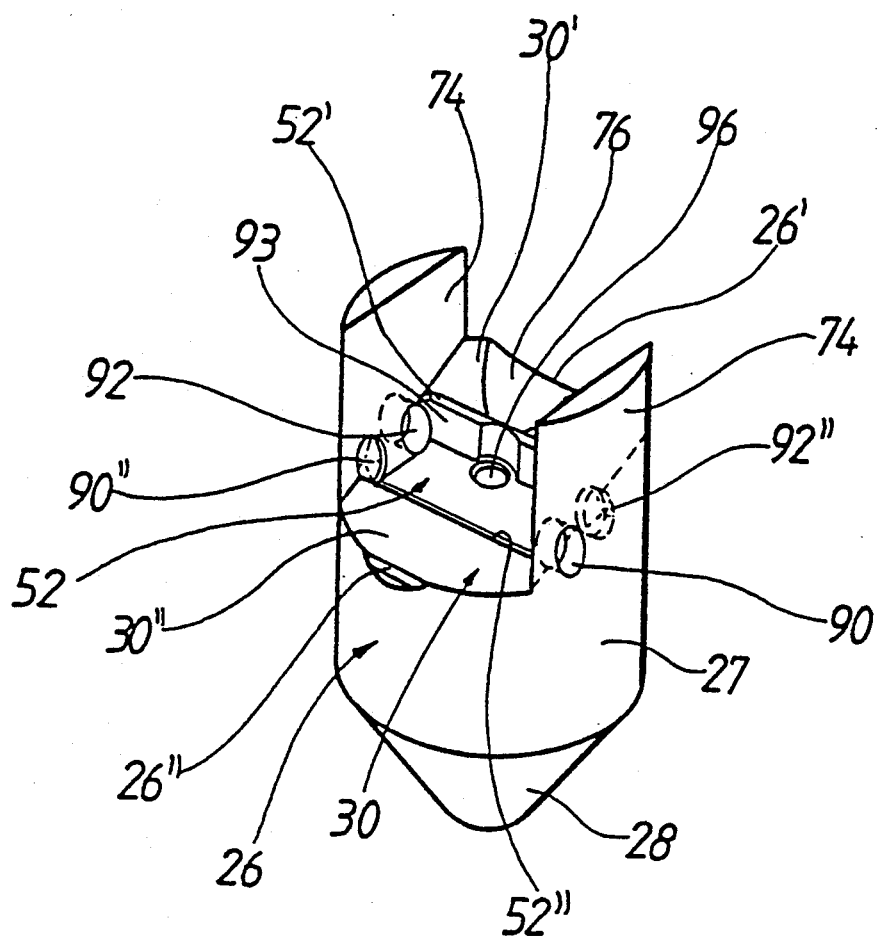
FIG. 4 is a perspective illustration of a further exemplary embodiment of a clamping bolt with a milled transverse groove.
Figure 5:
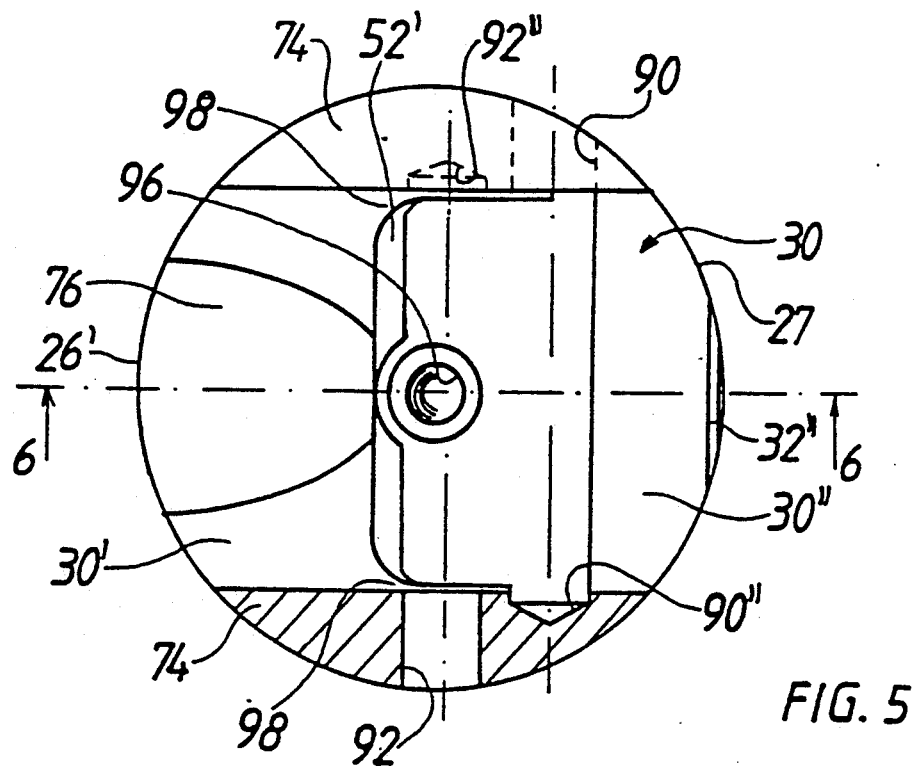
FIG. 5 is a partially cross-sectioned top view of the clamping bolt according to FIG. 4.
Figure 6:
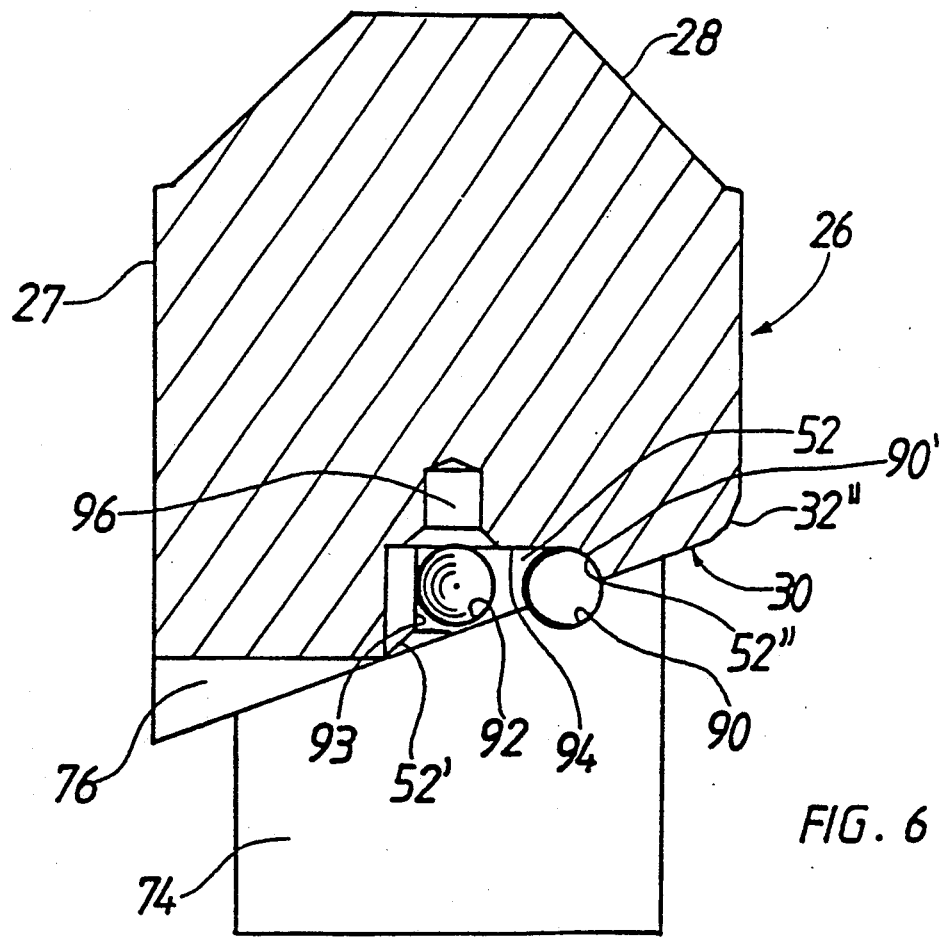
FIG. 6 is a cross-sectional view taken along the line of intersection 6—6 of FIG. 5.

FIGS. 4 to 6 show a further exemplary embodiment of a clamping bolt 26, which embodiment is modified compared with FIG. 3. The transverse groove of the clamping bolt is manufactured by a milling method. Two transverse blind bores 90, 92, which are arranged offset from one another, are first machined from opposite sides into the rod-like blank. Subsequently, when the tapered surface 30 between the two side cheeks 74 is milled into the blank, the bore 90 breaks open toward the sloped surface. It is then possible to begin machining through the broken open bore 90 the transverse groove 52 with a cutter introduced at the front face into the space between the guide cheeks 74 and to break into the transverse bore 92, with the remaining wall part 90' forming the transverse flank 52' of the transverse groove 52. The transverse flank 52" receives a vertical section 93 during the milling operation, which section is chamfered toward the tapered surface 30 forming the receiving slope. A coaxial centering bore 96 is formed as a manufacturing aid into the floor 94 of the transverse groove 52, which floor is perpendicular with respect to the axis of the bolt. The centering bore 96 intersects with its edge area into the transverse flank 52'. The edge steps 98 remaining after the milling operation in the area of the receiving slope 52' must take into consideration a suitable material removal on the wedge-shaped member 32 so that the two parts can mate in the area of their respective transverse grooves. The through bore sections 90, 92 remaining in the side cheeks 74 form in the finished clamping bolt a lubricant bore leading from the outer surface 27 to the tapered surface 30. The furthermore remaining blind holes 90", 92" have only a small depth of approximately 0.1 mm and guarantee that at this point during the machining operation no material projection remains toward the inside of the guide cheeks 74.

Figure 7:
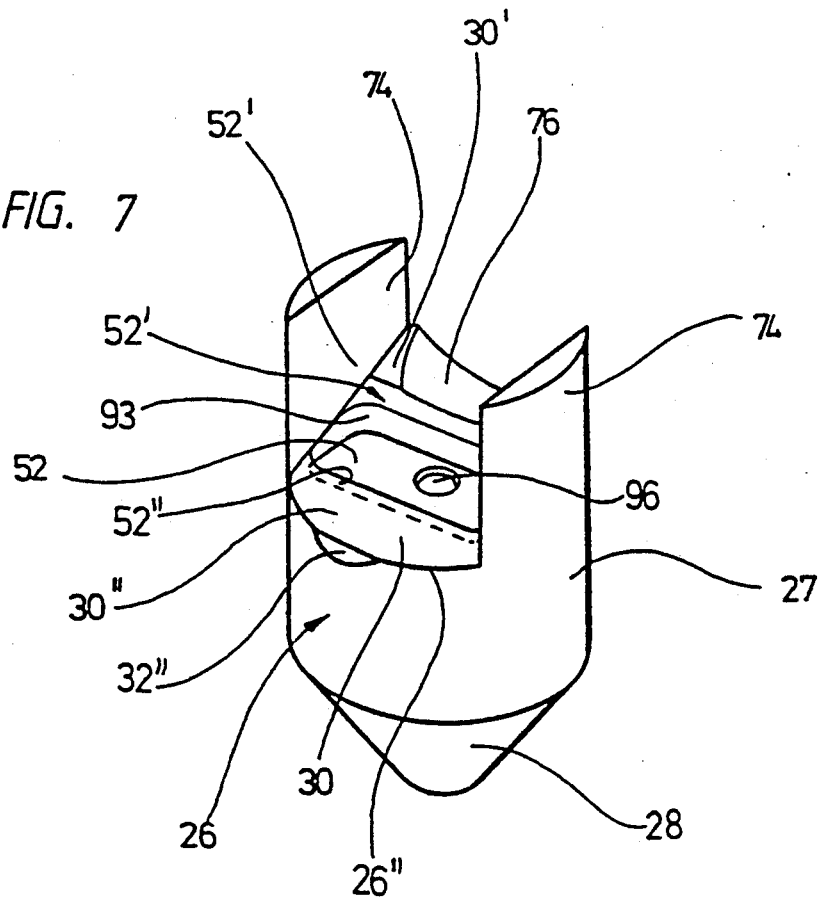
FIG. 7 is a perspective illustration of a further exemplary embodiment of a clamping bolt with a milled transverse groove and an eroded receiving slope.
Figure 8:
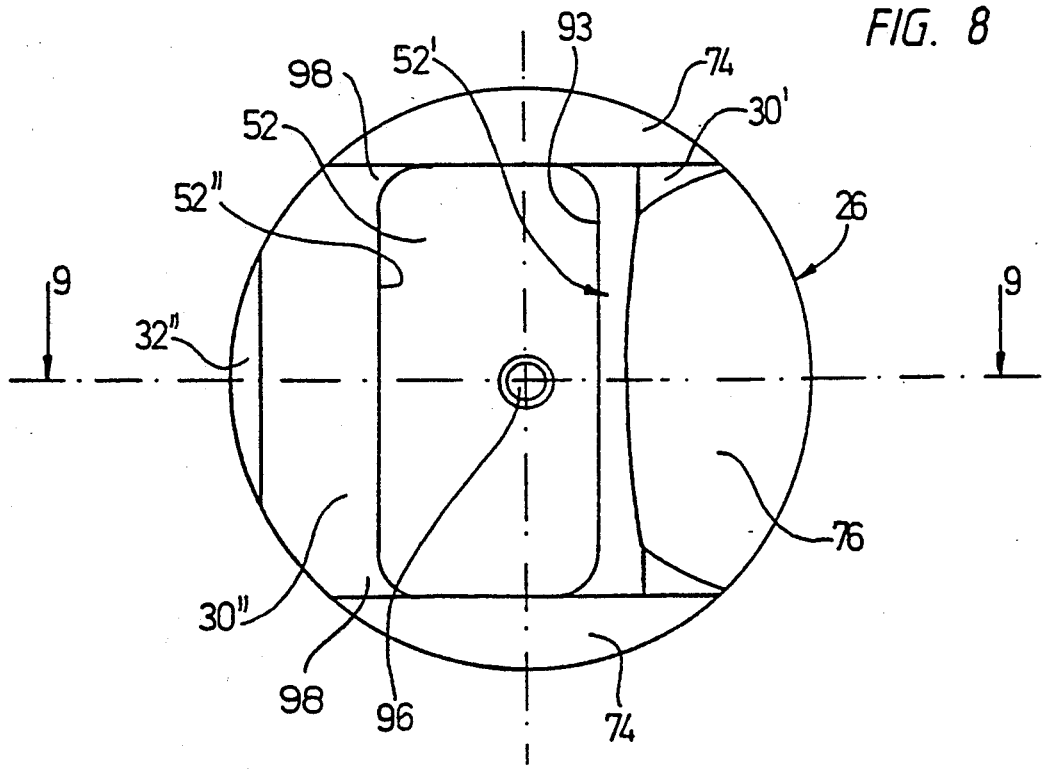
FIG. 8 is a top view of the clamping bolt according to FIG. 7.
Figure 9:
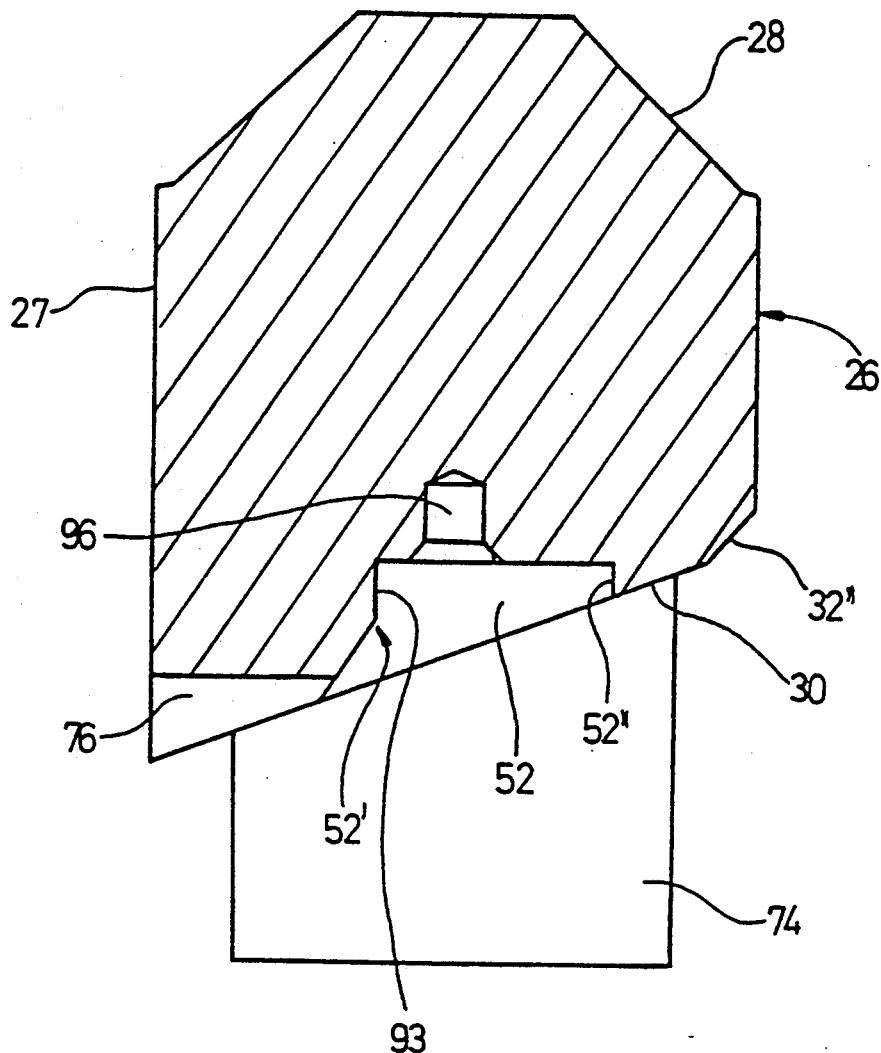
FIG. 9 is a cross-sectional view taken along the line of intersection 9—9 of FIG. 8.

In the exemplary embodiment of a clamping bolt 26 illustrated in FIGS. 7 to 9, the deep part of the transverse groove 52 between the side cheeks 74 is manufacture by a milling method after the tapered surface 30 has first been milled. The transverse flank 52' receives during the milling operation a vertical section 93, which is subsequently chamfered by an eroding method forming thereby a receiving slope toward the tapered surface 30. The receiving slope extends in all areas to the side cheeks 74 so that the corner radii with the edge steps 98 occurring in the exemplary embodiment according to FIGS. 4 to 6 are eliminated. Furthermore, by using this method of manufacture, the transverse bores 90, 92 or openings 80 in the side cheeks are not needed.

The embodiments of the invention in which an exclusive property or privilege is claimed are defined as follows:

1. In a device for releasably connecting a tool to a spindle of a machine tool comprising a fitting aperture concentric with respect to the spindle axis, a fitting pin extending into the fitting aperture, at least one clamping bolt movably supported in radial direction in the fitting pin, a clamping member axially movable by means of a clamping mechanism arranged in the spindle, and two tapered surfaces, one being provided on the clamping member and the other being provided on the clamping bolt, are positioned inclined with respect to the spindle axis, and rest against one another, for facilitating a radial adjustment of the clamping bolt between a release position pulled back into the fitting pin and a radially outwardly extended clamping position, the improvement wherein the clamping member and the clamping bolt each have a transverse groove which face one another defined by transverse flanks in the area of their respective tapered surfaces, through which transverse groove the tapered surfaces are divided into two partial surfaces each lying in the same plane arranged spaced from one another and limited on one side by one of the transverse flanks and on another side by an outer transverse edge, wherein in the release position, each of the partial surfaces extends into the oppositely lying transverse groove, wherein, during the clamping operation, at least one of the transverse flanks and/or transverse edges that strike one another has a receiving slope which is steeper relative to the spindle axis compared with the tapered surface, and wherein in the clamping position both partial surfaces rest against one another.

2. The device according to claim 1, wherein the receiving slope has a pitch that varies with respect to the spindle axis.

3. The device according to claim 1, wherein at least one of the receiving slopes is curved convexly.

4. The device according to claim 3, wherein at least one of the receiving slopes transfers smoothly into the tapered surface.

5. The device according to claim 1, wherein the transverse flank of the essentially rotationally symmetrical clamping bolt, which transverse flank during the clamping operation first strikes the clamping member, is arranged near the axis of the clamping bolt.

6. The device according to claim 1, wherein the transverse edge of the clamping bolt, which transverse edge strikes the transverse flank of the clamping member during the clamping operation, is at least once chamfered or convexly curved.

7. The device according to claim 1, in which the clamping bolt has two guide cheeks for the clamping member, which guide cheeks laterally limit the tapered flanks, wherein the transverse groove of the clamping bolt is limited at least at its one end by one of the guide cheeks.

8. The device according to claim 1, wherein the transverse groove of the clamping bolt is manufactured or milled by the spark-erosion method.

9. The device according to claim 8, wherein front-face boundary surfaces of the transverse groove project step-like over the guide surfaces of the guide cheeks, and wherein the clamping member has at its lateral guide surfaces in the area of the parts engaging the transverse groove a corresponding material removal.

10. The device according to claim 1, wherein the transverse groove of the clamping bolt is milled and the transverse flank striking the clamping member is eroded in the area of the receiving slope.

11. The device according to claim 8, including a through slotted hole arranged in extension of the transverse groove in one of the guide cheeks.

12. The device according to claim 11, including a blind hole arranged in extension of the transverse groove in one of the guide cheeks.

13. The device according to claim 1, wherein the transverse grooves have an essentially trapezoidal cross section with at least one outwardly diverging flank.

14. The device according to claim 1, wherein the clamping bolt has a lubricating channel leading from its cylindrical outer surface to the tapered surface, with one end of the lubricating channel terminating at the transverse groove.

15. The device according to claim 1, wherein the clamping bolt is releasably lockable in its release pulled back position into the fitting pin.

16. The device according to claim 15 including a stop screw screwed into the fitting pin, a tip of the screw being received in a boundary groove closed at its end, wherein the screw tip carries a locking ball movable against the force of a spring, which locking ball, in the pulled back release position of the clamping bolt, extends into a locking recess arranged in the area of the floor of the groove.

17. The device according to claim 1, wherein the tapered surface defines an angle of 8° to 20° with the spindle axis.

18. The device according to claim 1, wherein the receiving the slope defines an angle of 40° to 70° with the spindle axis.

19. The device according to claim 1, including at least one transverse bore ending through one of the guide cheeks in the transverse groove.

20. The device according to claim 19, wherein in each guide cheek there is arranged a transverse bore ending in the transverse groove.

21. The device according to claim 20, wherein the transverse bores end in the area of each one of the transverse edges in the transverse groove.

22. The device according to claim 19, including a blind hole aligned with the transverse bore and open toward the transverse groove in the oppositely lying guide cheek.

23. The device according to claim 19, wherein at least one of the transverse flanks is defined by a part of the transverse bore surface, which part extends into the area of the tapered surface.

24. The device according to claim 1, wherein the receiving slope is constructed as a chamfer in a transverse flank essentially parallel with respect to the clamping bolt axis.

25. The device according to claim 1, wherein the transverse groove floor is aligned essentially perpendicular with respect to the clamping bolt axis.

26. The device according to claim 1, including a centering bore in the transverse groove floor, which centering bore is coaxial with respect to the clamping bolt axis.

27. The device according to claim 1, wherein the receiving slope is intersected by the centering bore.

* * * * *